United States Patent
Sung et al.

(10) Patent No.: US 12,453,871 B2
(45) Date of Patent: Oct. 28, 2025

(54) APPARATUS FOR CONTROLLING ULTRASOUND GENERATION DEVICE AND METHOD THEREOF

(71) Applicants: GODIUS CO., LTD., Seoul (KR); Young Mo Sung, Suwon (KR)

(72) Inventors: Young Mo Sung, Suwon (KR); Dong Hwan Kang, Seoul (KR)

(73) Assignees: Godius Co., Ltd., Seoul (KR); Young Mo Sung, Suwon (KR)

( * ) Notice: Subject to any disclaimer, the term of this patent is extended or adjusted under 35 U.S.C. 154(b) by 0 days.

(21) Appl. No.: 18/640,580

(22) Filed: Apr. 19, 2024

(65) Prior Publication Data

US 2024/0316370 A1  Sep. 26, 2024

Related U.S. Application Data

(63) Continuation of application No. PCT/KR2022/014029, filed on Sep. 20, 2022.

(30) Foreign Application Priority Data

Oct. 26, 2021 (KR) .......................... 10-2021-0143646

(51) Int. Cl.
*A61N 7/02* (2006.01)
*A61N 7/00* (2006.01)
*G16H 40/63* (2018.01)

(52) U.S. Cl.
CPC ............... *A61N 7/02* (2013.01); *G16H 40/63* (2018.01); *A61N 2007/0052* (2013.01); *A61N 2007/0082* (2013.01); *A61N 2007/0091* (2013.01)

(58) Field of Classification Search
CPC ............ A61N 7/02; A61N 2007/0052; A61N 2007/0082; A61N 2007/0091;
(Continued)

(56) References Cited

U.S. PATENT DOCUMENTS 10,130,828 B2    11/2018  Vortman et al.
2020/0029941 A1*  1/2020  Avendi ................. A61B 8/4254
(Continued)

FOREIGN PATENT DOCUMENTS

JP    2008526326 A    7/2008
JP    2012504011 A    2/2012
(Continued)

OTHER PUBLICATIONS

Japanese Patent Office, Notice of Reasons for Refusal regarding Application No. 2024-548336, Mar. 7, 2025.
(Continued)

*Primary Examiner* — Hien N Nguyen
(74) *Attorney, Agent, or Firm* — Leydig, Voit & Mayer Ltd.

(57) ABSTRACT

A method for performing an ultrasonic treatment includes: setting, by a processor, information for a moving trajectory, an ultrasound irradiation unit, and/or an ultrasound irradiation spot; outputting, by the processor, a transducer control signal based on the set information; ultrasonically irradiating, by a transducer, based on the transducer control signal, one or more points while moving following a preset moving trajectory; scanning, by the transducer, the one or more irradiated points to obtain an image; determining, by the processor, based on the image, whether an ultrasound irradiation area contains a remaining tumor; and based on determining that the ultrasound irradiation area contains a remaining tumor, performing additional ultrasonic irradiation, wherein performing the additional ultrasonic irradiation is based on remaining tumor possibility information generated based on a machine learning process.

20 Claims, 11 Drawing Sheets

(58) Field of Classification Search
CPC .. A61N 2007/0095; A61N 7/00; G16H 40/63; A61B 8/08; A61B 8/085; A61B 8/5223; G06N 20/00
See application file for complete search history.

(56) References Cited

U.S. PATENT DOCUMENTS

| | | | | |
|---|---|---|---|---|
| 2020/0176083 | A1* | 6/2020 | Zhang | G16B 40/20 |
| 2020/0227168 | A1* | 7/2020 | Kimmerling | G06N 5/01 |
| 2020/0398084 | A1* | 12/2020 | Guha | C07K 14/71 |
| 2022/0117509 | A1* | 4/2022 | Garff | G16H 50/30 |
| 2022/0175260 | A1* | 6/2022 | Sonck | G16H 50/20 |
| 2023/0111593 | A1* | 4/2023 | Schuster | A61K 40/4211 |
| | | | | 424/93.21 |
| 2023/0306762 | A1* | 9/2023 | Lee | G06V 20/698 |
| 2024/0221158 | A1* | 7/2024 | Sasaki | G06T 7/00 |
| 2024/0225588 | A1* | 7/2024 | Nien | G16H 15/00 |
| 2024/0233946 | A1* | 7/2024 | Choi | G06N 3/09 |

FOREIGN PATENT DOCUMENTS

| | | |
|---|---|---|
| JP | 2012-519549 A | 8/2012 |
| JP | 2013128731 A | 7/2013 |
| JP | 2016129599 A | 7/2016 |
| KR | 100895358 B1 | 4/2009 |
| KR | 10-2019-0090583 A | 8/2019 |
| KR | 10-2019-0140920 A | 12/2019 |
| KR | 10-2021-0006792 A | 1/2021 |
| KR | 102209382 B1 | 1/2021 |
| KR | 10-2245150 B1 | 4/2021 |
| KR | 10-2313667 B1 | 10/2021 |

OTHER PUBLICATIONS

Korean Patent Office, Notice of Submission of Opinions regarding Application No. 10-2024-0013043, Dec. 3, 2024.
Korean Intellectual Property Office, International Search Report in International Patent Application No. PCT/KR2022/014029 (Dec. 15, 2022).

* cited by examiner

APPARATUS FOR CONTROLLING ULTRASOUND GENERATION DEVICE AND METHOD THEREOF

CROSS-REFERENCE TO RELATED APPLICATIONS

The present application is a continuation of International Patent Application No. PCT/KR2022/014029, filed on Sep. 20, 2022, which claims the benefit of priority to Korean Patent Application No. 10-2021-0143646, filed on Oct. 26, 2021. The disclosures of the above-identified applications are hereby incorporated by reference herein in their entireties.

FIELD

Embodiments of the present disclosure relate to an apparatus for controlling an ultrasound generating device and a method thereof, and more particularly, to an apparatus for controlling an ultrasound generating device and a method thereof, which can induce a thermal superposition phenomenon by setting multiple ultrasound irradiation units for ultrasound irradiation and perform additional volume ultrasound irradiation by using machine learning technique even for a remaining tumor after an initial procedure.

BACKGROUND

Generally, an irradiation method using high-intensity focused ultrasound (HIFU) is referred to as a method that burns and eliminates tissue lesions in a body using high temperature heat of 65 to 100 degrees Celsius generated by focus when high-intensity ultrasound energy is focused on a single point.

In other words, if ultrasound, which is about 100,000 times stronger than the intensity of ultrasound used for diagnosis, is focused on a focal point, heat is generated at the focal point, which can be used to burn away tissue lesions in the body.

Since ultrasound itself is harmless to the human body and generates heat only at the focal point on which the ultrasound is focused, the ultrasound may reduce trauma in a patient and necrotize lesions in the body in a more non-invasive manner than surgical or chemotherapy methods.

Accordingly, high-intensity focused ultrasound irradiation is possible to use in the ultrasound irradiation of pancreatic cancer, uterine myoma, liver cancer, and the like, and active research is also being conducted into the use thereof in the ultrasound irradiation of prostate cancer, endometrial cancer, kidney cancer, breast cancer, soft tissue tumors, and bone tumors.

Particularly, high-intensity focused ultrasound irradiation has a more sensitive destructive effect against anaerobic tumor cells.

However, due to the natural thermal conductivity and blood supply of the human body, the ultrasound irradiation target area dissipates heat as the high-intensity focused ultrasound is irradiated.

From the acoustical and biophysical mean parameters of the body's soft tissues, it is known that the depth at which the mean maximum effective irradiation depth of the lesion in subcutaneous soft tissues by high-strength focused ultrasound can be various centimeters.

In addition, the high-intensity focused ultrasound irradiation has a very low irradiation speed, making it difficult for patients to endure the time required for ultrasound irradiation even for medium-sized lesions.

Research into a technique that can reliably emit KW-level high-intensity focused ultrasound through excellent focus execution is key to realizing the concept of "one-time non-invasive irradiation" with high-intensity focused ultrasound.

To implement this, a conventional high-intensity focused ultrasound irradiation head is provided with a high-intensity focused ultrasonic transducer at an end thereof.

The high-intensity focused ultrasound transducer is configured to emit high-intensity focused ultrasound.

In addition, a membrane is mounted on the high-intensity focused ultrasonic transducer to cover the high-intensity ultrasonic radiation surface of the high-intensity focused ultrasonic transducer.

In this state, the ultrasonic transmission medium is filled in the receiving space between the high-intensity ultrasonic radiation surface and the membrane.

In general, degassed water is used as the ultrasonic transmission medium.

Additionally, the high-intensity focused ultrasound irradiation head may be provided with an imaging transducer for acquiring a diagnostic image.

This high-intensity focused ultrasound irradiation head is located above a patient and emits high-intensity focused ultrasound through the high-intensity ultrasound radiation surface while the membrane is in contact with the patient's skin.

However, the size of tumors in the human body may develop in various ways, and the ultrasound irradiation is completed only when all tissue lesions are necrotized.

Therefore, when ultrasound is irradiated along an ultrasound irradiation pathway without a specific condition, a volume ultrasound irradiation is not performed, and the longer the ultrasound irradiation time is required as the volume of the tissue lesion becomes greater.

In this case, the ultrasound irradiation time is prolonged, causing inconvenience to the patient and increasing stress and fatigue in a user performing the ultrasound irradiation method.

On the other hand, Artificial Intelligence (AI) mimics the human brain and neuron neural networks, which may allow computers and devices to think and act like humans at some point in the future.

Machine learning refers to the field of defining various problems addressed in the field of artificial intelligence and studying methodologies to solve the same.

An Artificial Neural Network (ANN) is a model used in machine learning and may refer to overall models with problem-solving ability, including artificial neurons (nodes) that have formed a network by combining synapses.

Such an ANN may include an input layer, an output layer, and optionally, one or more hidden layers.

Here, machine learning may be classified into supervised learning, unsupervised learning, and reinforcement learning according to the learning method.

Supervised learning refers to a method of training an artificial neural network while a label for training data is provided, and the label may mean a correct answer (or result value) that the artificial neural network needs to infer when the training data is input to the artificial neural network.

Unsupervised learning may mean a method of training an artificial neural network without being provided a label for the training data.

Reinforcement learning may refer to a learning method in which an agent defined within an environment is trained to select an action or order of actions that maximizes the cumulative reward in each state.

Generally, it is typically represented as an interconnection of neuron systems that compute values from inputs and which is adaptable, allowing machine learning such as pattern recognition to be performed.

Like other machines learning from data, neural networks are commonly used to solve a wide range of problems, such as image recognition or speech recognition, which are difficult to solve with rule-based programming.

In other words, the random forest that outputs classification or average predictions (regression analysis) from a number of decision trees constructed during the training process, the extreme gradient boosting (XGBoost) that creates a strong learner by sequentially adding a predictor to correct previous errors, and LASSO Regression, which has an absolute value of a regression coefficient as a penalty term and makes the weight '0,' are being applied to areas such as the image recognition, and excellent performance machine learning technique are being developed.

SUMMARY

In an example embodiment, the present disclosure provides a method for performing an ultrasonic treatment. The method includes: setting, by a processor, information for a moving trajectory, an ultrasound irradiation unit, and/or an ultrasound irradiation spot; outputting, by the processor, a transducer control signal based on the set information; ultrasonically irradiating, by a transducer, based on the transducer control signal, one or more points while moving following a preset moving trajectory; scanning, by the transducer, the one or more irradiated points to obtain an image; determining, by the processor, based on the image, whether an ultrasound irradiation area contains a remaining tumor; and based on determining that the ultrasound irradiation area contains a remaining tumor, performing additional ultrasonic irradiation, wherein performing the additional ultrasonic irradiation is based on remaining tumor possibility information generated based on a machine learning process.

BRIEF DESCRIPTION OF FIGURES

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
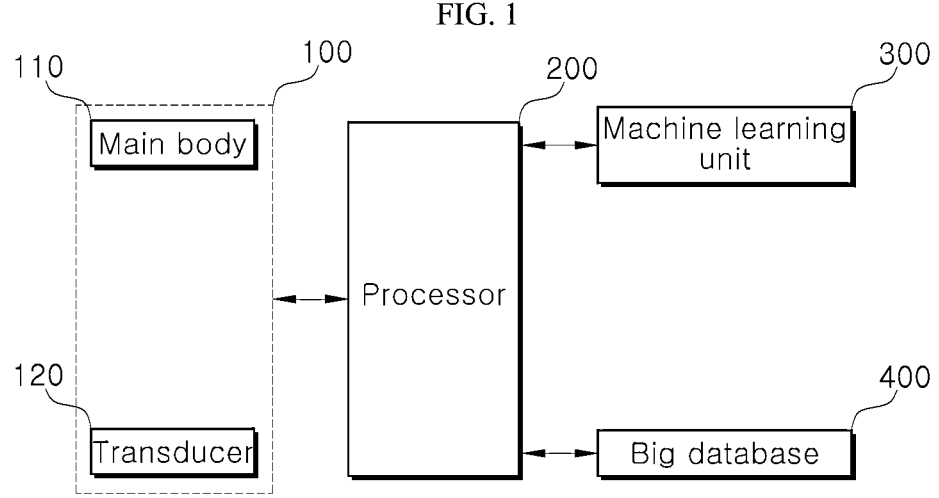
FIG. 1 is a block diagram illustrating an apparatus for controlling an ultrasound generating device according to an embodiment of the present disclosure.

Example embodiments of the present disclosure provide an apparatus for controlling an ultrasound generating device and a method thereof, which can induce a thermal superposition phenomenon by setting multiple ultrasound irradiation units for ultrasound irradiation and perform additional ultrasound irradiation per volume by receiving pre-learned remain possibility information of a tumor for a corresponding ultrasound irradiation portion by using machine learning technique, even in the case of ultrasound irradiation of any remaining tumor after an initial procedure, thereby safely necrotizing all tissue lesions in a short period of time.

Example embodiments of the present disclosure provide an apparatus for controlling an ultrasound generating device and a method thereof, which can induce a thermal superposition phenomenon by setting multiple ultrasound irradiation units by which a irradiation is performed by focusing ultrasound at an ultrasound irradiation point and perform additional ultrasound irradiation per volume by receiving pre-learned remain possibility information of the tumor for a corresponding ultrasound irradiation portion by using machine learning technique even for the remaining tumor after the initial procedure, thereby safely necrotizing the all tissue lesions in a short time.

Example embodiments of the present disclosure further provide an apparatus for controlling an ultrasound generating device and a method thereof.

Technical problems are not limited to the technical problems mentioned above, and other technical problems not mentioned herein will be clearly understood by those skilled in the art from the following description.

A method for controlling an ultrasound generating device according to an aspect of the present disclosure may include setting, by a processor, basic information for one or more of a moving trajectory of ultrasound, an ultrasound irradiation unit, and an ultrasound irradiation spot, and outputting a corresponding transducer control signal; irradiating, by a transducer, ultrasound to one or more points while moving following the preset moving trajectory by being synchronized with the transducer control signal, and scanning an image for the irradiated spot; and determining, by the processor, whether there is any tumor remaining in an ultrasound irradiation area by receiving the scanned image, based on the tumor remaining in the ultrasound irradiation area, after a machine learning unit learns, performing additional ultrasound irradiation per volume by receiving pre-learned remain possibility information of the tumor.

The operation of output may include setting, by the processor, the moving trajectory of the ultrasound to a first ultrasound irradiation unit; setting, by the processor, the number of maximum ultrasound irradiation units and a number of points of the ultrasound irradiated per ultrasound irradiation unit; and setting, by the processor, the number of pulses of the ultrasound irradiated per spot and a spacing between the points.

The operation of scanning may include scanning, by a transducer unit for obtaining an image in the transducer, an image for a subject by transmitting an ultrasound signal for imaging to the subject in response to the control of the processor and receiving an ultrasound signal reflected from the subject; generating, by the processor, a control signal for the transducer having a predetermined time interval; moving, by the transducer, along the predetermined moving trajectory by being synchronized with the generated control signal for the transducer; irradiating, by the transducer unit for ultrasound irradiation in the transducer, the ultrasound on the one or more points by focusing the ultrasound such that a high intensity focused ultrasound is focused on a focal point on the predetermined moving trajectory; and scanning, by the transducer unit for obtaining an image in the transducer, an image of the irradiated one or more points and a peripheral ultrasound irradiation area.

The operation of scanning may include calculating, by the processor, a distance between the transducer and an ultrasound irradiation target; moving, by the processor, the transducer to a periphery of the ultrasound irradiation area by making a translational movement of a main body by applying a first control signal to the main body; aligning, by the processor, the transducer with the ultrasound irradiation target by wobbling and rotating the transducer toward the ultrasound irradiation target of a subject by applying a second control signal to the main body; and irradiating, by the transducer unit for ultrasound irradiation in the transducer, ultrasound on one or more points by focusing a high-intensity focused ultrasound signal on the aligned ultrasound irradiation target position; and scanning, by the transducer unit for obtaining an image in the transducer, an image of the irradiated one or more points and the peripheral ultrasound irradiation area in response to the control of the processor.

The operation of performing may include determining, by the processor, whether there is any remaining tumor by receiving the scanned image; based on the tumor remaining in the ultrasound irradiation area, by the machine learning unit, generating the remain possibility information of the tumor for three-dimensional position and size of the tumor, which is remaining and expected, through machine learning technique and storing the remain possibility information in a big database; moving, by the processor, the main body to the position of the remaining tumor by receiving the pre-learned remain possibility information of the tumor for a corresponding portion through the big database; and performing, by the transducer linked to the main body, an additional ultrasound irradiation per volume ultrasound irradiation of the remaining position by moving and rotating vertically and horizontally.

The machine learning technique is an extreme gradient boosting technique.

The number of lines of the moving trajectory set as the first ultrasound irradiation unit by the processor is 1 to 5 lines.

The processor sets the number of points of the ultrasound irradiated per ultrasound irradiation unit to 1 to 7.

The processor sets the number of pulses of the ultrasound irradiated per point to between 20 to 50.

The processor sets the spacing between the points to 1 to 5 mm.

An apparatus for controlling an ultrasound generating device according to another aspect of the present disclosure may include a processor configured to set basic information for one or more of a moving trajectory of ultrasound, an ultrasound irradiation unit, and an ultrasound irradiation point, and output a corresponding transducer control signal; a transducer configured to irradiate ultrasound to one or more points while moving following the preset moving trajectory by being synchronized with the transducer control signal, and scan an image for the irradiated spot; and a machine learning unit configured to perform a machine learning for the tumor remaining in the ultrasound irradiation area determined by receiving the scanned image by the processor, and generate remain possibility information of the tumor for three-dimensional position and size of the tumor, which is remaining and expected, wherein the processor performs additional ultrasound irradiation per volume by receiving the pre-learned remain possibility information of the tumor from the machine learning unit.

The processor sets the moving trajectory on which the ultrasound is irradiated to a first ultrasound irradiation unit, sets a number of maximum ultrasound irradiation units and a number of points of the ultrasound irradiated per ultrasound irradiation unit, and sets a number of pulses of the ultrasound irradiated per ultrasound irradiation unit and a spacing between the points.

The transducer unit for obtaining an image in the transducer scans an image for a subject by transmitting an ultrasound signal for imaging to the subject in response to the control of the processor and receiving an ultrasound signal reflected from the subject, the processor generates a control signal for the transducer having a predetermined time interval, the transducer moves along the predetermined moving trajectory while being synchronized with the generated control signal for the transducer, the transducer unit for ultrasound irradiation in the transducer irradiates the ultrasound on the one or more points by focusing the ultrasound such that a high-intensity focused ultrasound is focused on a focal point on the predetermined moving trajectory, and the transducer unit for obtaining an image in the transducer scans an image of the irradiated one or more points and a peripheral ultrasound irradiation area in response to the control of the processor.

The processor calculates a distance between the transducer and an ultrasound irradiation target, the processor moves the transducer to a periphery of the ultrasound irradiation area by making a translational movement of a main body by applying a first control signal to the main body, the processor aligns the transducer with the ultrasound irradiation target by wobbling and rotating the transducer toward the ultrasound irradiation target of a subject by applying a second control signal to the main body, the transducer unit for ultrasound irradiation in the transducer irradiates ultrasound on one or more points by focusing a high-intensity focused ultrasound signal on the aligned ultrasound irradiation target position, and the transducer unit for obtaining an image in the transducer scans an image of the irradiated one or more points and the peripheral ultrasound irradiation area in response to the control of the processor.

The processor determines whether there is any remaining tumor by receiving the scanned image, based on the tumor remaining in the ultrasound irradiation area, the machine learning unit generates the remain possibility information of the tumor for three-dimensional position and size of the tumor, which is remaining and expected, through machine learning technique and storing the remain possibility information in a big database, the processor moves the main body to the position of the remaining tumor by receiving the pre-learned remain possibility information of the tumor for a corresponding portion through the big database, and the transducer linked to the main body performs an additional ultrasound irradiation per volume for the remaining position by moving and rotating vertically and horizontally.

Other details of the present disclosure are included in the detailed description and drawings.

Advantages and features of the present disclosure will be apparent with reference to embodiments described below in detail in conjunction with the accompanying drawings.

However, embodiments of the present disclosure are not limited to the embodiments disclosed below, but can be implemented in various forms, as these disclosed embodiments are merely examples.

The terminology used herein is for the purpose of describing example embodiments only and is not intended to be limiting. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first," "second," and the like are used to describe various components, these components are of course not limited by these terms. These terms are only used to distinguish one component from another.

Unless otherwise defined, all terms (including technical and scientific terms) used herein have the same meaning as commonly understood by one of ordinary skill in the art to which this disclosure belongs, in the context of the present disclosure. It will be further understood that terms such as those defined in commonly used dictionaries, will not be interpreted in an idealized or overly formal sense unless expressly so defined herein.

Spatially relative terms such as "below," "beneath," "lower," "above," and "upper" may be used to easily describe correlations between one component and other components, as illustrated in the drawing. Spatially relative terms should be understood as terms including different directions of the components in use or operation in addition to the directions illustrated in the drawing. For example, when a component illustrated in the drawing is flipped, a component described as "below" or "beneath" of another component may be placed "above" of another component. Accordingly, the exemplary term "below" may include both the lower and the upper directions. The component may be oriented in different directions, and thus spatially relative terms may be interpreted according to the orientation.

Hereinafter, embodiments of the present disclosure will be described with reference to the accompanying drawings.

FIG. 1 is a block diagram illustrating an apparatus for controlling an ultrasound generating device according to an embodiment of the present disclosure, which includes an ultrasound irradiation head 100, a processor 200, a machine learning unit 300, and a big database 400.

Figure 2:
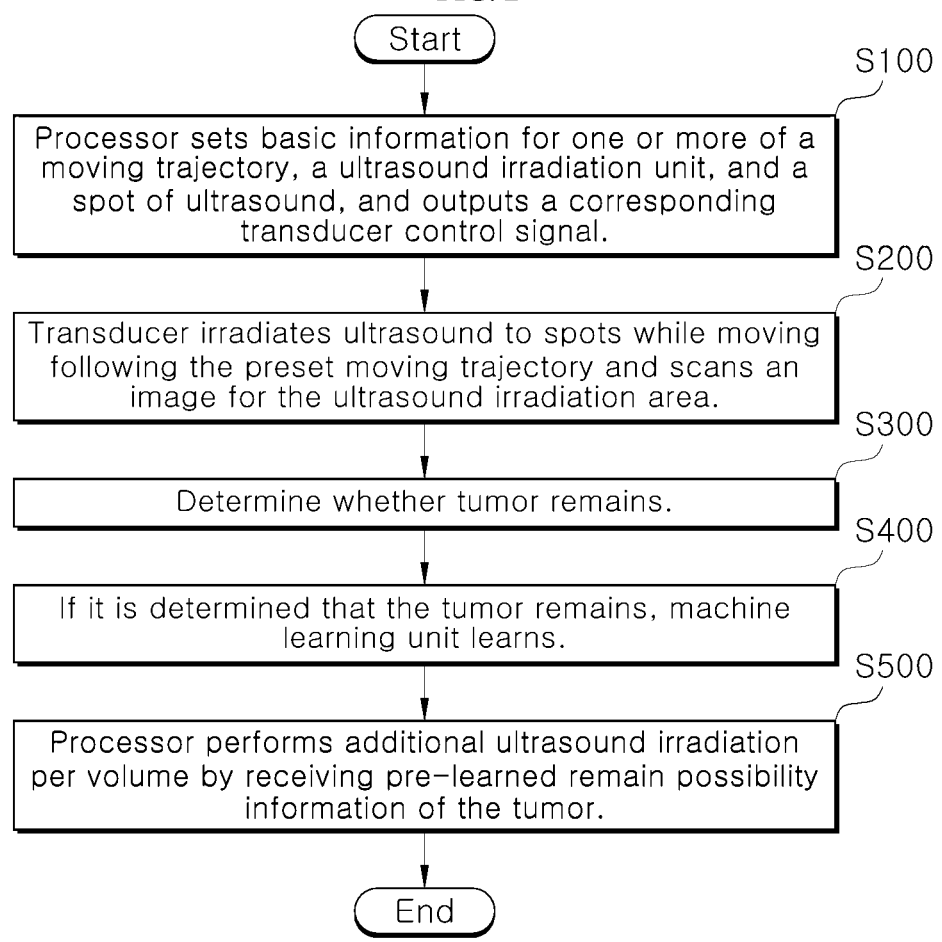
FIG. 2 is a flowchart illustrating an overall operation of a method for controlling an ultrasound generating device.

FIG. 2 is a flowchart illustrating an overall operation of a method for controlling an ultrasound generating device.

Figure 3:
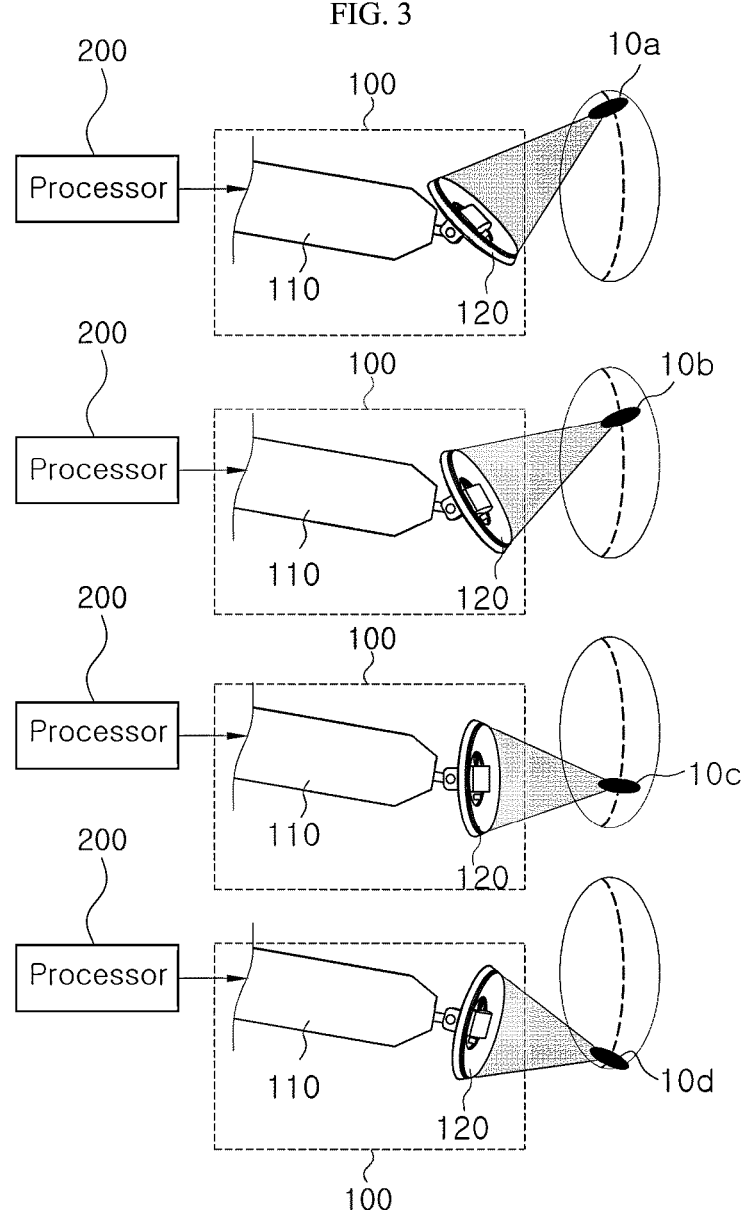
FIG. 3 is a schematic configuration diagram illustrating a wobbling operation of a transducer in an apparatus for controlling an ultrasound generating device according to an embodiment of the present disclosure.

FIG. 3 is a schematic configuration diagram illustrating a wobbling operation of a transducer in an apparatus for controlling an ultrasound generating device according to an embodiment of the present disclosure, which includes the ultrasound irradiation head 100 and the processor 200.

The ultrasound irradiation head 100 includes a main body 110 and a transducer 120, and the transducer 120 includes a transducer unit for obtaining an image and a transducer unit for ultrasound irradiation.

The transducer unit for obtaining an image transmits and receive an ultrasound signal for an image to scan an image for an ultrasound irradiation area of a subject, and the transducer unit for ultrasound irradiation forms a thermal lesion by focusing a high-intensity focused ultrasound signal to gather in one focal point in the ultrasound irradiation area.

The operation of the method for controlling an ultrasound generating device according to an embodiment of the present disclosure briefly described with reference to FIG. 1 to FIG. 3 as below.

First, the processor 200 sets basic information for one or more of a moving trajectory of ultrasound, an ultrasound irradiation unit, and an ultrasound irradiation point, and outputs a corresponding transducer control signal (operation S100).

Here, the moving trajectory refers to a line connecting points to which ultrasonic waves are irradiated continuously, the ultrasound irradiation unit refers to a minimum unit of the moving trajectory in which the ultrasound irradiation is performed, and the point refers to a bright area generated by the irradiation of ultrasonic wave among the ultrasound irradiation areas during the ultrasonic ultrasound irradiation sites.

That is, the processor 200 sets the moving trajectory to which ultrasonic waves are irradiated as a first ultrasound irradiation unit (operation S110), sets the number of maximum ultrasound irradiation units and the number of points of the ultrasound irradiated per ultrasound irradiation unit (operation S120), and sets the number of pulses of the ultrasound irradiated per ultrasound irradiation unit and a spacing between the points (operation S130).

Next, the transducer 120 irradiates ultrasound to one or more points while moving following the preset moving trajectory in the processor 200 by being synchronized with the transducer control signal of the processor 200, and scans an image for the irradiated point (operation S200).

In other words, the transducer unit for obtaining an image in the transducer scans an image for a subject by transmitting an ultrasound signal for imaging to the subject in response to the control of the processor 200 and receiving an ultrasound signal reflected from the subject (operation S210).

In addition, when the processor 200 generates the transducer control signal having a predetermined time interval (operation S220), the transducer 120 moves following the preset moving trajectory by the processor 200 by being synchronized with the transducer control signal generated by the processor 200 (operation S230).

Thereafter, the transducer unit for ultrasound irradiation in the transducer 120 irradiates the ultrasound on the one or more points by focusing the ultrasound such that a high-intensity focused ultrasound is focused on a focal point on the predetermined moving trajectory by the processor 200 (operation S240), and the transducer unit for obtaining an image in the transducer 120 scans an image of the irradiated one or more points and a peripheral ultrasound irradiation area in response to the control of the processor 200 (operation S250).

Next, the processor 200 determines whether there is any tumor remaining in an ultrasound irradiation area by receiving the scanned image, based on the tumor remaining in the ultrasound irradiation area, after a machine learning unit 300 learns, and the processor 200 performs an additional ultrasound irradiation per volume by receiving pre-learned remain possibility information of the tumor (operation S300).

That is, the processor 200 determines whether there is any remaining tumor by receiving the scanned image from the transducer 120 (operation S310).

If it is determined that the tumor does not remain (operation S320), the ultrasound irradiation operation is terminated (operation S330), and it is determined that there is any remaining tumor, the machine learning unit 300 generates the remain possibility information of the tumor for three-dimensional position and size of the tumor, which is remaining and expected, through machine learning technique and stores the remain possibility information in a big database 400 (operation S410).

Thereafter, the processor 200 moves the main body to the position of the remaining tumor by receiving the pre-learned remain possibility information of the tumor for the corresponding portion through the big database 400 (operation S510), and the transducer 120 linked to the main body performs an additional volume ultrasound irradiation for the remaining position by moving and rotating vertically and horizontally (operation S520).

Figure 4:
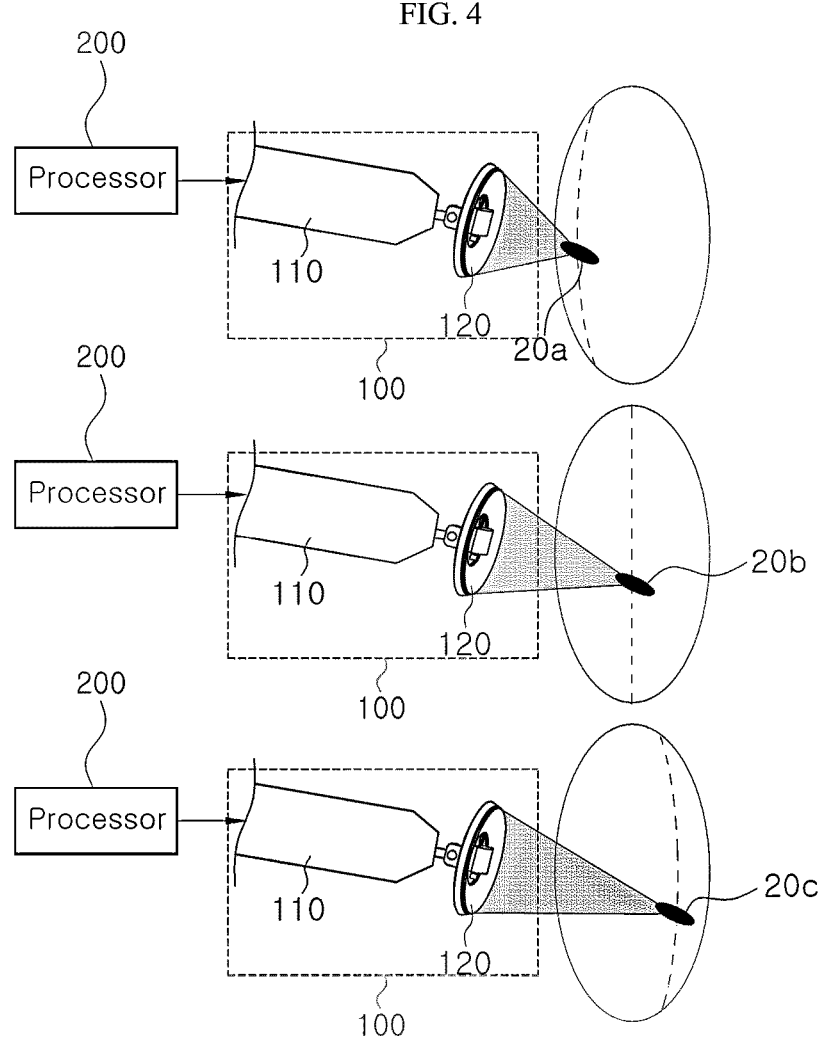
FIG. 4 is a schematic configuration diagram illustrating an ultrasound point distance adjustment operation of the apparatus for controlling an ultrasound generating device shown in FIG. 3.

FIG. 4 is a schematic configuration diagram illustrating an ultrasound point distance adjustment operation of the apparatus for controlling an ultrasound generating device shown in FIG. 3, and the ultrasound irradiation head 100 and the processor 200 are included therein.

The ultrasound irradiation head 100 includes the main body 110 and the transducer 120, and the transducer 120 includes a transducer unit for obtaining an image and a transducer unit for ultrasound irradiation.

Figure 5:
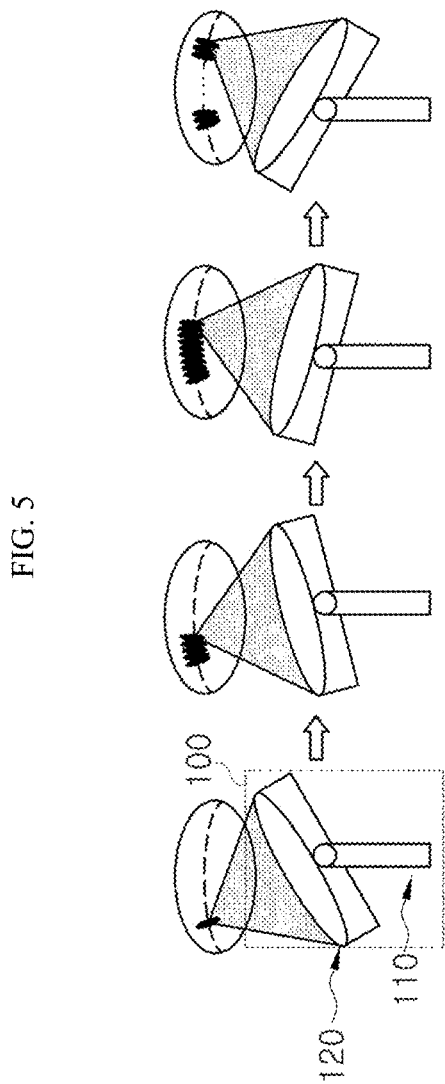
FIG. 5 is a configuration diagram sequentially illustrating an embodiment of forming a plurality of thermal lesions by focusing on a three-dimensional surface following a moving trajectory through the wobbling operation of the transducer in the ultrasound generating device shown in FIG. 3.

FIG. 5 is a configuration diagram sequentially illustrating an embodiment of forming a plurality of thermal lesions by focusing on a three-dimensional surface following a moving trajectory through the wobbling operation of the transducer in the ultrasound generating device shown in FIG. 3, and the main body 110 and the transducer 120 are included therein.

Figure 6:
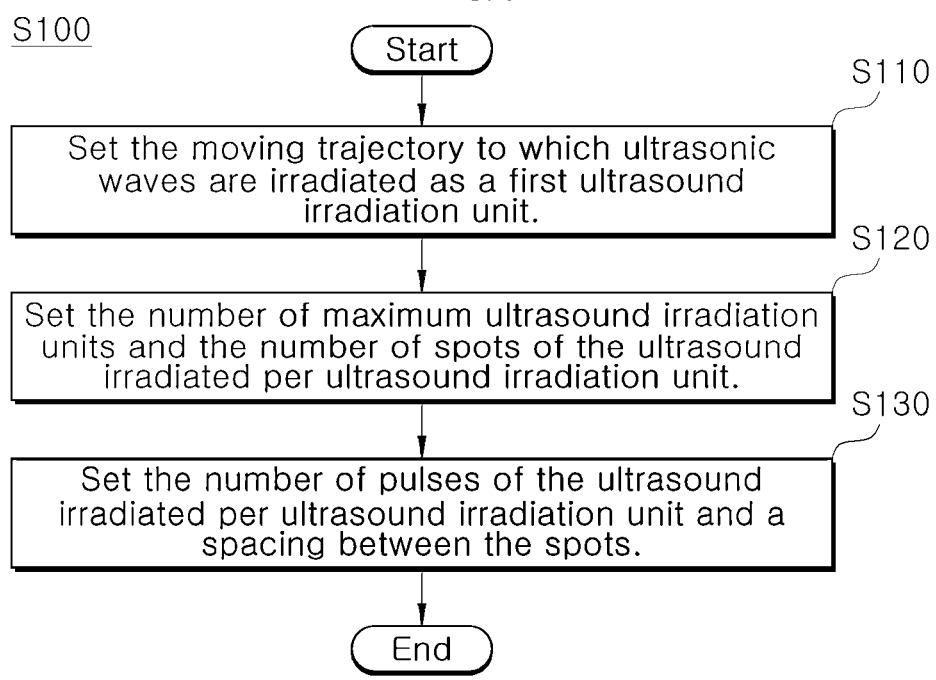
FIG. 6 is a flowchart illustrating a detailed operation of the operation S100 of the method for controlling an ultrasound generating device shown in FIG. 2.

FIG. 6 is a flowchart illustrating a detailed operation of the operation S100 of the method for controlling an ultrasound generating device shown in FIG. 2.

Figure 7:
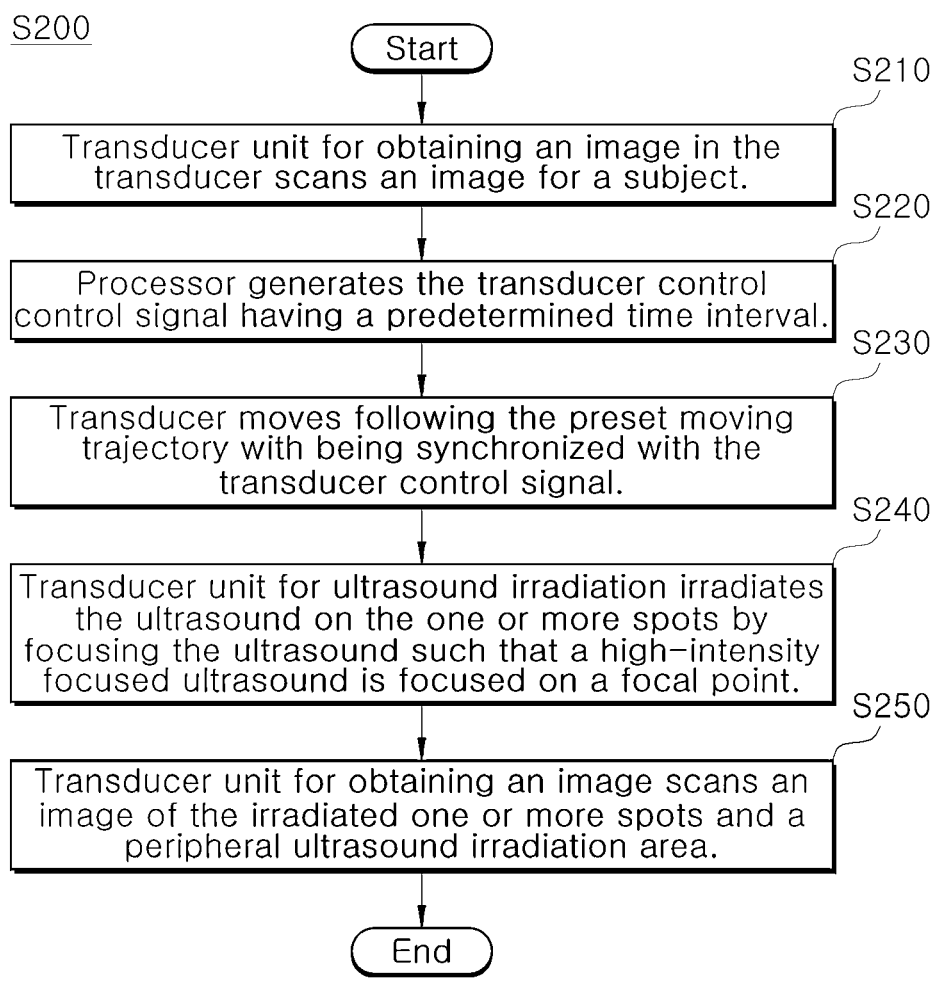
FIG. 7 is a flowchart illustrating a detailed first operation of the operation S200 of the method for controlling an ultrasound generating device shown in FIG. 2.

FIG. 7 is a flowchart illustrating a detailed first operation of the operation S200 of the method for controlling an ultrasound generating device shown in FIG. 2.

Figure 8:
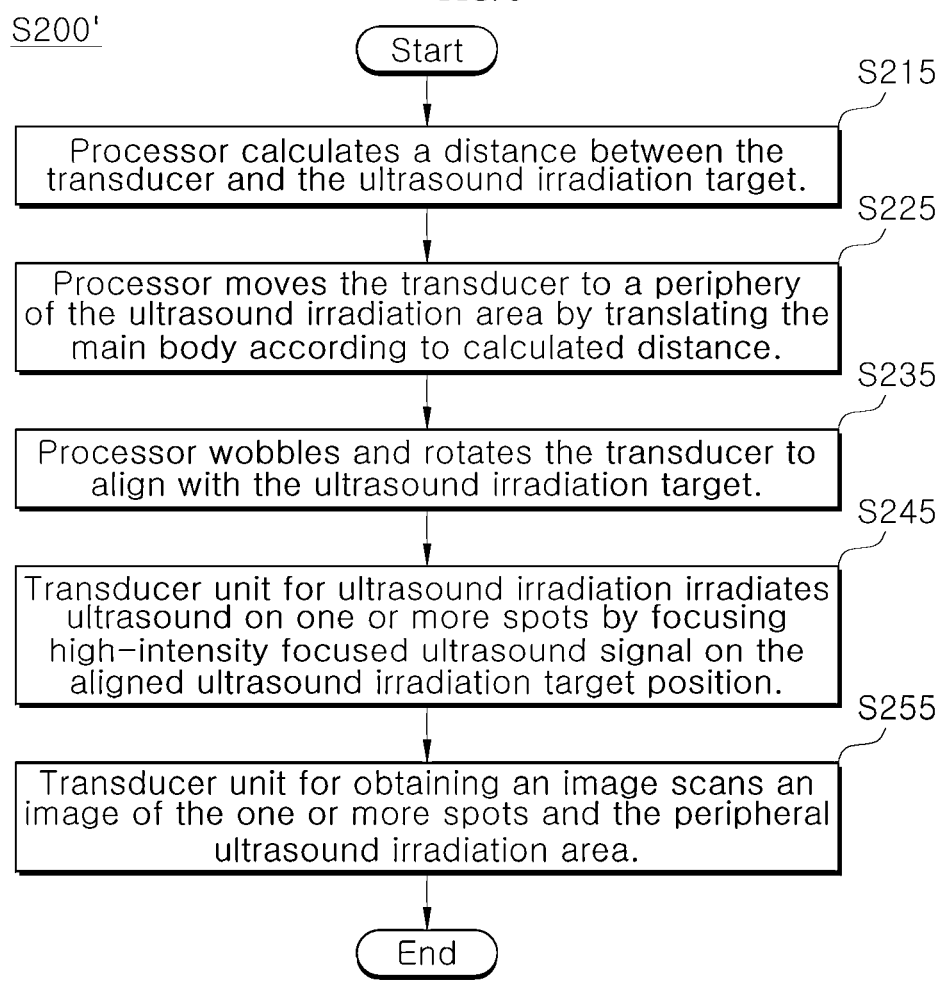
FIG. 8 is a flowchart illustrating a detailed second operation of the operation S200 of the method for controlling an ultrasound generating device shown in FIG. 2.

FIG. 8 is a flowchart illustrating a detailed second operation of the operation S200 of the method for controlling an ultrasound generating device shown in FIG. 2.

Figure 9:
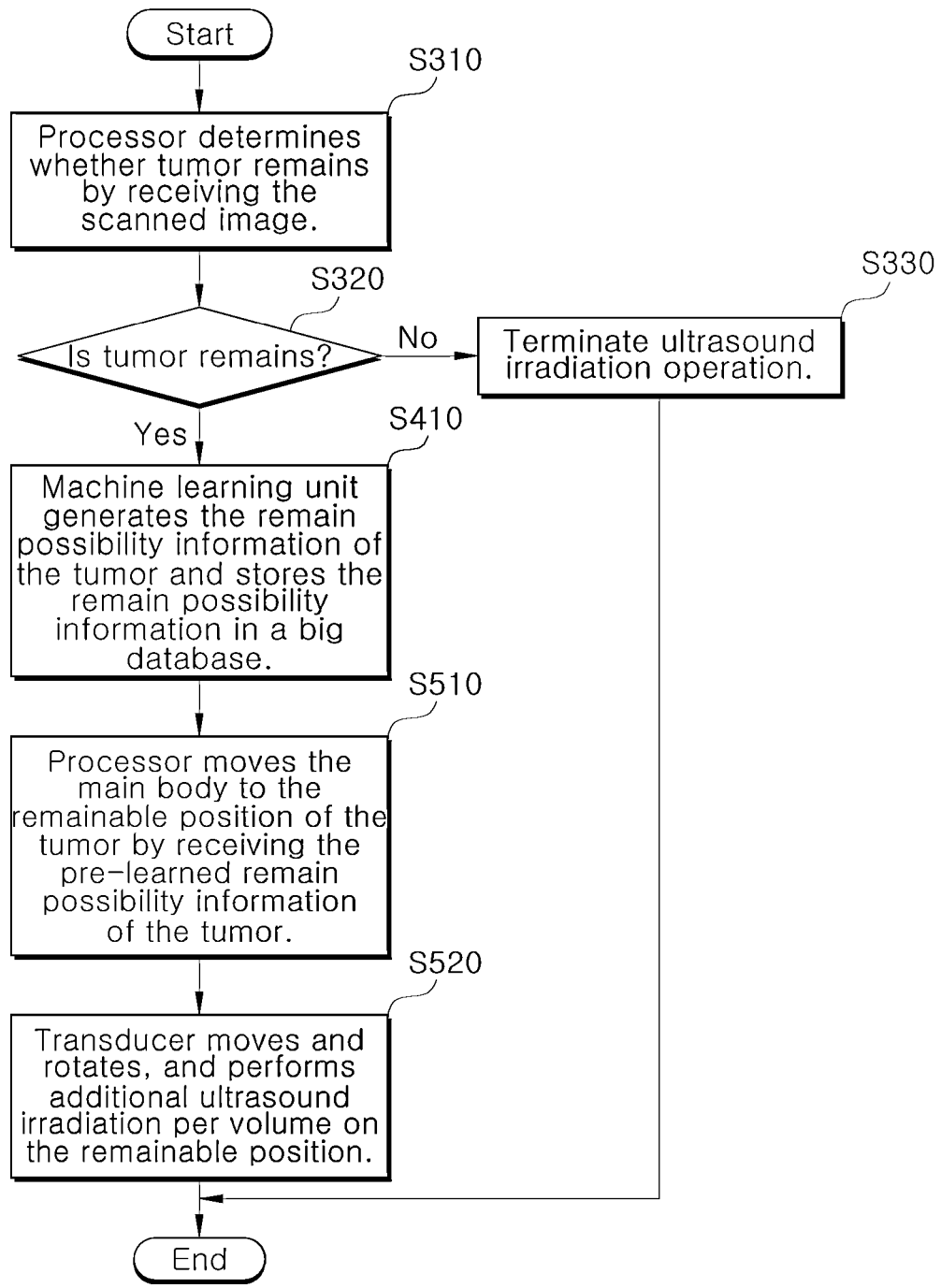
FIG. 9 is a flowchart illustrating a detailed operation of the operations S300 to S500 of the method for controlling an ultrasound generating device shown in FIG. 2.

FIG. 9 is a flowchart illustrating a detailed operation of the operations S300 to S500 of the method for controlling an ultrasound generating device shown in FIG. 2.

Figure 10:
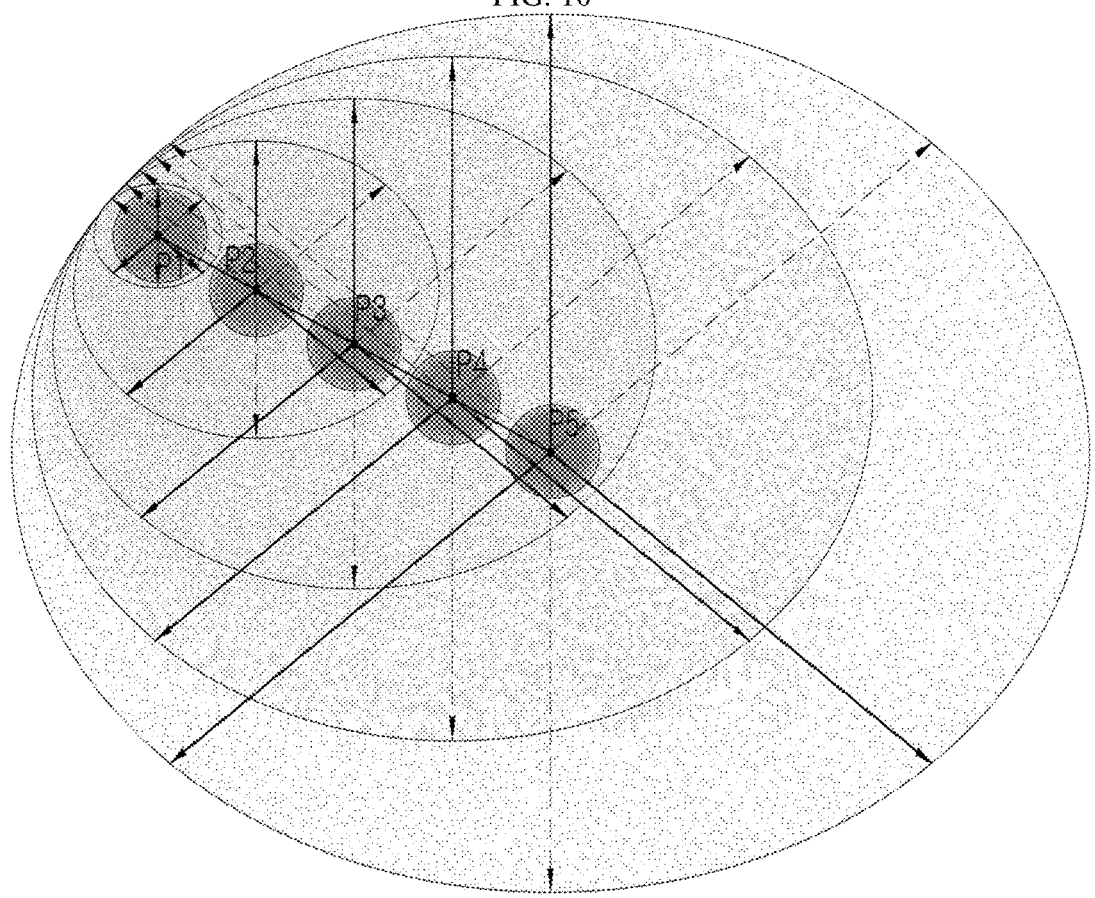
FIG. 10 is a diagram illustrating the thermal superposition phenomenon of a plurality of thermal lesions formed following a moving trajectory through the wobbling operation of the transducer according to the embodiment shown in FIG. 5.

FIG. 10 is a diagram illustrating the thermal superposition phenomenon of a plurality of thermal lesions formed following a moving trajectory through the wobbling operation of the transducer according to the embodiment shown in FIG. 5.

Figure 11:
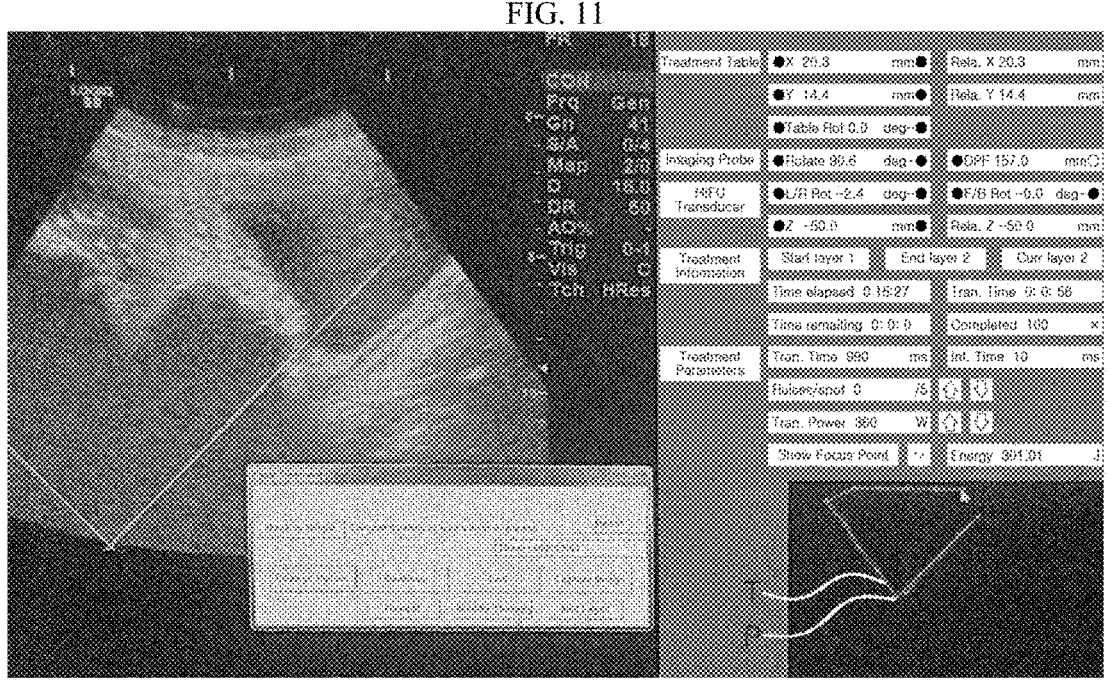
FIG. 11 is an ultrasound photograph showing a set moving trajectory in an actual volume ultrasound irradiation and multiple points on which the ultrasound is irradiated according to an embodiment of the present disclosure.

FIG. 11 is an ultrasound photograph showing a set moving trajectory in an actual ultrasound irradiation depending on volume and multiple points on which the ultrasound is irradiated according to an embodiment of the present disclosure.

The sequential operation of a method for controlling an ultrasound generating device according to an embodiment of the present disclosure is described in detail with reference to FIG. 1 to FIG. 11 as below.

Referring to FIG. 3, the transducer for obtaining an image in the transducer 120 scans the image of the subject by transmitting the ultrasound signal for imaging to the subject and receiving the ultrasound signal reflected from the subject, and the transducer unit for ultrasound irradiation focuses the high-intensity focused ultrasound signal to gather at one focal point in the ultrasound irradiation area to form a thermal lesion.

That is, while the transducer 120 of the ultrasound irradiation head 100 wobbles around the warbling axis, the transducer 120 performs three-dimensional image scanning of the ultrasound irradiation area of the subject and four-dimensional focusing of the high-intensity focused ultrasound signal in the ultrasound irradiation area to form multiple thermal lesions.

For example, as illustrated in FIG. 3, the transducer 120 may focus the high-intensity focused ultrasound signal on the ultrasound irradiation targets 10*a*, 10*b*, 10*c*, and 10*d* in the subject's ultrasound irradiation area along the movement trajectory (clockwise or counterclockwise) to form four thermal lesions.

Referring to FIG. 4, the processor 200 adjusts the distance of the ultrasonic point irradiated to the ultrasound irradiation area of the subject by electronically controlling the transducer 120.

For example, by calculating the distance between the transducer 120 and the ultrasound irradiation targets 20*a*, 20*b*, and 20*c*, the position of the transducer 120 may be electronically adjusted to focus the high-intensity focused ultrasound signal on the ultrasound irradiation target at the calculated distance.

After the processor 200 moves the ultrasound irradiation head 100 around the ultrasound irradiation area, the transducer 120 of the ultrasound irradiation head 100 is precisely mechanically adjusted (wobbled and rotated) to perform ultrasound irradiation through three-dimensional image scanning and four-dimensional focusing on the ultrasound irradiation area.

For example, the processor 200 applies a first control signal to the ultrasound irradiation head 100 to translate the main body 110 of the ultrasound irradiation head 100 by a calculated distance to move the transducer 120 in a periphery of the ultrasound irradiation area in a body.

Thereafter, a second control signal is applied to the ultrasound irradiation head 100 to wobble and rotate the transducer 120 toward the ultrasound irradiation target of the subject to align it with the ultrasound irradiation target, and the transducer for obtaining an image scans the three-dimensional image of the subject or the transducer for ultrasound irradiation focuses the high-intensity focused ultrasound signal in the ultrasound irradiation area in four dimension.

At this time, the reason for scanning the three-dimensional image of the subject is to check whether the tumor is still present in the ultrasound irradiation area by receiving the three-dimensional image of the subject scanned with the transducer for obtaining an image in the transducer 120 in preparation for the initial ultrasound irradiation.

In the above embodiment, it is exemplified that the processor 200 electronically controls the transducer 120 to adjust the distance of the ultrasonic point, but the transducer 120 may be mechanically controlled.

Referring to FIG. 6, it is assumed that the processor 200 sets one line of a moving trajectory (pathway) to which ultrasound is irradiated as a first ultrasound irradiation unit.

The processor 200 generates a plurality of pulses having at least one of a predetermined time interval, an energy amount, and an ON/Off time, determines an acoustic power, a sonication time, and the like set depending on a tumor size, and outputs a transducer control signal corresponding thereto.

The transducer 120 irradiates ultrasound to one or more points at a predetermined time interval by being synchronized with the transducer control signal generated while moving according to a preset pathway per the ultrasound irradiation unit in response to the transducer control signal of the processor 200.

In this case, according to the present disclosure, an ultrasound irradiation is performed according to the following conditions to necrotize all tissue lesions in a short time using the thermal superposition phenomenon.

That is, the processor 200 sets one line of the pathway to which the ultrasound is irradiated as one ultrasound irradiation unit, and sets the maximum number of ultrasound irradiation units to 10 lines.

However, if ultrasound is irradiated with more than 6 lines, there is a risk of burns, so 1 to 5 lines are preferable.

Particularly, in the case of uterine myoma ultrasound irradiation, the maximum number of ultrasound irradiation units is most preferably 1 to 4 lines.

Here, the processor 200 may also be referred to as a processor, a controller, a microcontroller, a microprocessor, a microcomputer, or the like, and may be implemented by hardware, firmware, software, or a combination thereof.

The transducer 120 irradiates 1 to 10 points per the first ultrasound irradiation unit in response to the control of the processor 200.

However, in the case that ultrasound is irradiated to 8 or more points, there is a risk of burns, so 1 to 7 points are preferable.

Particularly, in the case of uterine myoma ultrasound irradiation, the number of points of ultrasound irradiated per ultrasound irradiation unit is most preferably 5 points.

The range of the number of points on the ultrasound may be adjusted according to the size of the lesion.

The transducer 120 irradiates ultrasound of 5 to 50 pulses per point.

The number of pulses of ultrasound irradiated per point is preferably within 20 to 50, and for uterine myoma ultrasound irradiation, it is most preferably within 35 to 45.

The transducer 120 irradiates ultrasound having an energy of 20 to 70 J per pulse.

The energy amount of the ultrasonic point is preferably 30 to 60 J, and for the ultrasound irradiation of uterine myoma, 40 to 60 J is most preferable.

In the ON/Off time at which ultrasound is irradiated with the transducer 120, the ON time is preferably 1 to 1500 ms, and the OFF time is preferably 3 to 20 ms.

The irradiated ON time is preferably within 1 to 1000 ms, and the Off time is preferably 5 to 15 ms.

The transducer 120 irradiates ultrasound at a predetermined time interval.

The spacing between points is within 0.1-10 mm, preferably 1-5 mm, and most preferably 1.5-2.5 mm for uterine myoma ultrasound irradiation.

In addition, even in the case that ultrasound is accurately irradiated according to the above conditions, all tissue lesions may not be completely necrotic due to the initial ultrasound irradiation.

In preparation for this, according to the present disclosure, a predictor may be sequentially added so that the machine learning unit 300 corrects an error in the initial ultrasound procedure by using a machine learning technique such as extreme gradient boosting (XGBoost).

That is, after the initial ultrasound irradiation, the control unit 200 determines whether the tumor is still present.

If it is determined that the tumor is not all necrotic and remains, the ultrasound irradiation operation is terminated.

On the other hand, when it is determined that all tumors are not necrotic and remain, the machine learning unit 300 performs machine learning using a machine learning technique such as extreme gradient boosting (XGBoost).

That is, by correcting the error (residual of the tumor) in the initial ultrasound irradiation procedure and sequentially adding remain possibility information of the tumor, such as the expected three-dimensional position and size of the tumor, which is remaining, so that the tumor is all necrotic, the remain possibility information of the tumor around the ultrasound irradiation target at the ultrasound irradiation portion is accurately determined and stored in the big database 400.

In addition, the processor 200 moves the main body 110 to the position of the remaining tumor by receiving the pre-learned remain possibility information of the tumor for the corresponding portion through the big database 400 through the extreme gradient boosting technique.

Accordingly, the transducer 120 linked to the main body 110 moves up, down, left, and right to perform additional ultrasound irradiation per volume on the remaining position.

Referring to FIG. 10, a circle indicates a point for irradiating ultrasound, and an arrow in the XYZ axis direction indicates a diffusion direction of heat generated when the transducer 120 irradiates ultrasound.

When ultrasound is irradiated along the moving trajectory, for example, the diffusion of heat generated at each of the five points causes superposition, resulting in the ultrasound irradiation.

Through this, according to the present disclosure, the heat generated at a first point P1 overlaps and diffuses in four-dimension on the moving trajectory, and the temperature maintains to a last point P5, which enables ultrasound irradiation depending on volume to necrotize all tissue lesions in a short time.

In this case, the reason why heat overlaps and spreads in three-dimension is that the transducer 120 moves up, down, left, and right while performing additional ultrasound irradiation per volume in real time in four-dimension.

Referring to FIG. 11, the moving trajectory set during the actual volume ultrasound irradiation is shown as a line (T) on the lower right black background of the photograph, and multiple points irradiated with ultrasound are shown as dots (P).

At this time, the angle of the line, which is a movement trajectory, may increase when it is a large lesion, and in the case of a small lesion, it may be set small for intensive ultrasound irradiation in a narrow area.

In this manner, the present disclosure provides an apparatus for controlling an ultrasound generating device and a method thereof which can induce a thermal superposition phenomenon by setting multiple ultrasound irradiation units for which a ultrasound irradiation is performed by focusing ultrasound at an ultrasound irradiation point and perform additional volume ultrasound irradiation by receiving pre-learned remain possibility information of the tumor for a corresponding portion by using machine learning technique even for the remaining tumor after the initial procedure, thereby safely necrotizing all tissue lesions in a short time.

Through this, according to the present disclosure, by using the diffusion and superposition of heat generated during ultrasound irradiation, the heat generated at the first point on the moving trajectory of the ultrasound point spreads in a three-dimensional form and is maintained to the last ultrasound point, enabling volume ultrasound irradiation to necrotize tissue lesion in a short time.

In addition, even in the case that all tissue lesions are not completely necrotic by the first ultrasound irradiation, all of the tissue lesions can be safely necrotic by determining whether there is any tumor remaining in the ultrasound irradiation area and performing additional volume ultrasound irradiation using the machine learning technique.

Methods or algorithms described in connection with embodiments of the present disclosure may be implemented directly with hardware, as a software module executed by the hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any form of non-transitory computer-readable recording medium well known in the art to which the present disclosure pertains.

Although embodiments of the present disclosure have been described above with reference to the accompanying drawings, those skilled in the art to which the present disclosure pertains will understand that the present disclosure may be practiced in other specific forms without departing from the principles of the present disclosure. Therefore, it should be understood that the embodiments described above are exemplary in all respects and are not limited thereto.

According to the present disclosure, by using the diffusion and superposition of heat generated during ultrasound irradiation, the heat generated at the first point on the moving trajectory of the ultrasound point spreads in a three-dimensional form and is maintained to the last ultrasound point, enabling volume ultrasound irradiation that can necrotize tissue lesion in a short time.

Furthermore, even in the case that all of the tissue lesions are not completely necrotic by the first ultrasound procedure, all of the tissue lesions can be safely necrotic by determining whether there is any tumor remaining in the ultrasound irradiation area and performing additional ultrasound irradiation per volume using the machine learning technique.

Technical effects of the present disclosure are not limited to the technical effects mentioned above, and other technical effects not mentioned will be clearly understood by those skilled in the art from the foregoing description.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, comprising:
   setting, by a processor, information for a moving trajectory, an ultrasound irradiation unit, and/or an ultrasound irradiation spot;
   outputting, by the processor, a transducer control signal based on the set information;
   ultrasonically irradiating, by a transducer, based on the transducer control signal, one or more points while moving following a preset moving trajectory;
   scanning, by the transducer, the one or more irradiated points to obtain an image;
   determining, by the processor, based on the image, whether an ultrasound irradiation area contains a remaining tumor to be treated; and
   based on determining that the ultrasound irradiation area contains a remaining tumor to be treated, performing additional ultrasonic irradiation, wherein performing the additional ultrasonic irradiation is based on remaining tumor possibility information generated based on a machine learning process, wherein the remaining tumor possibility information includes an expected three-dimensional position and size of the remaining tumor to be treated.

2. The method of claim 1, wherein setting the information comprises:
   setting, by the processor, the moving trajectory to a first ultrasound irradiation unit;
   setting, by the processor, a maximum number of ultrasound irradiation units and a number of points irradiated per ultrasound irradiation unit; and
   setting, by the processor, a number of pulses of irradiation per point and a spacing between the points.

3. The method of claim 2, wherein the first ultrasound irradiation unit is set to include 1 to 5 lines.

4. The method of claim 2, wherein a maximum number of points irradiated per ultrasound irradiation unit is set to be in a range of 1 to 7.

5. The method of claim 2, wherein the number of pulses of irradiation per point is set to be in a range of 20 to 50.

6. The method of claim 2, wherein the spacing between the points is set to be in a range of 1 to 5 mm.

7. The method of claim 1, wherein scanning the one or more irradiated points to obtain the image comprises:
   transmitting, by the transducer, an ultrasonic signal to a subject and receiving, by the transducer, a reflected ultrasonic signal reflected from the subject.

8. The method of claim 1, wherein ultrasonically irradiating the one or more points comprises irradiating a respective point of the one or more points by focusing ultrasonic waves on the respective point.

9. The method of claim 1, wherein the image includes a peripheral ultrasound irradiation area peripheral to the one or more irradiated points.

10. The method of claim 9, wherein scanning the one or more irradiated points to obtain the image comprises:
   obtaining, by the processor, a distance between the transducer and an ultrasound irradiation target;
   moving, by the processor, the transducer to a periphery of the ultrasound irradiation area based on a translational movement;
   aligning, by the processor, the transducer with the ultrasound irradiation target by wobbling and rotating the transducer toward the ultrasound irradiation target; and
   scanning, by the transducer, the one or more irradiated points and the peripheral ultrasound irradiation area.

11. The method of claim 1,
   wherein performing the additional ultrasonic irradiation comprises:
      moving a main body of the transducer to a position of the remaining tumor to be treated based on the remaining tumor possibility information; and
      further moving and rotating the transducer.

12. The method of claim 1, wherein the machine learning process comprises an extreme gradient boosting technique.

13. An apparatus, comprising:
   a processor configured to:
      set information for a moving trajectory, an ultrasound irradiation unit, and/or an ultrasound irradiation spot; and
      output a transducer control signal based on the set information;
   a transducer configured to:
      ultrasonically irradiate, based on the transducer control signal, one or more points while moving following a preset moving trajectory; and
      scan the one or more irradiated points to obtain an image;
   wherein the processor is further configured to:
      determine, based on the image, whether an ultrasound irradiation area contains a remaining tumor to be treated; and
      based on determining that the ultrasound irradiation area contains a remaining tumor to be treated, control the transducer to perform additional ultrasonic irradiation, wherein performing the additional ultrasonic irradiation is based on remaining tumor possibility information generated based on a machine learning process, wherein the remaining tumor possibility information includes an expected three-dimensional position and size of the remaining tumor to be treated.

14. The apparatus of claim 13, wherein setting the information comprises:
   setting, by the processor, the moving trajectory to a first ultrasound irradiation unit;
   setting, by the processor, a maximum number of ultrasound irradiation units and a number of points irradiated per ultrasound irradiation unit; and
   setting, by the processor, a number of pulses of irradiation per point and a spacing between the points.

15. The apparatus of claim 13, wherein scanning the one or more irradiated points to obtain the image comprises:
   transmitting an ultrasonic signal to a subject and receiving a reflected ultrasonic signal reflected from the subject.

16. The apparatus of claim 13, wherein ultrasonically irradiating the one or more points comprises irradiating a respective point of the one or more points by focusing ultrasonic waves on the respective point.

17. The apparatus of claim 13, wherein the image includes a peripheral ultrasound irradiation area peripheral to the one or more irradiated points.

18. The apparatus of claim 17, wherein scanning the one or more irradiated points to obtain the image comprises:
   obtaining a distance between the transducer and an ultrasound irradiation target;
   moving the transducer to a periphery of the ultrasound irradiation area based on a translational movement;
   aligning the transducer with the ultrasound irradiation target by wobbling and rotating the transducer toward the ultrasound irradiation target; and
   scanning the one or more irradiated points and the peripheral ultrasound irradiation area.

19. The apparatus of claim 13,
   wherein performing the additional ultrasonic irradiation comprises:
      moving a main body of the transducer to a position of the remaining tumor to be treated based on the remaining tumor possibility information; and
      further moving and rotating the transducer.

20. A non-transitory computer-readable medium having processor-executable instructions stored thereon, wherein the processor-executable instructions, when executed, facilitate performance of the following:
   setting, by a processor, information for a moving trajectory, an ultrasound irradiation unit, and/or an ultrasound irradiation spot;
   outputting, by the processor, a transducer control signal based on the set information;
   ultrasonically irradiating, by a transducer, based on the transducer control signal, one or more points while moving following a preset moving trajectory;
   scanning, by the transducer, the one or more irradiated points to obtain an image;
   determining, by the processor, based on the image, whether an ultrasound irradiation area contains a remaining tumor to be treated; and
   based on determining that the ultrasound irradiation area contains a remaining tumor to be treated, performing additional ultrasonic irradiation, wherein performing the additional ultrasonic irradiation is based on remaining tumor possibility information generated based on a machine learning process, wherein the remaining tumor possibility information includes an expected three-dimensional position and size of the remaining tumor to be treated.

* * * * *